US006529939B1

(12) United States Patent
Kraft

(10) Patent No.: US 6,529,939 B1
(45) Date of Patent: Mar. 4, 2003

(54) USER-INITIATED MAINTENANCE OF DOCUMENT LOCATORS

(75) Inventor: Reiner Kraft, Gilroy, CA (US)

(73) Assignee: International Business Machines Coproation, Armonk, NY (US)

(*) Notice: Subject to any disclaimer, the term of this patent is extended or adjusted under 35 U.S.C. 154(b) by 0 days.

(21) Appl. No.: 09/442,067

(22) Filed: Nov. 16, 1999

(51) Int. Cl.[7] ............................................. G06F 13/00
(52) U.S. Cl. ...................... 709/203; 709/219; 709/223; 707/10; 707/200
(58) Field of Search ................................ 709/202, 203, 709/217, 219, 223, 224, 226, 329; 707/10, 104, 200

(56) References Cited

U.S. PATENT DOCUMENTS

| | | | |
|---|---|---|---|
| 5,649,186 A | 7/1997 | Ferguson | 395/610 |
| 5,727,158 A | 3/1998 | Bouziane et al. | 395/200.55 |
| 5,751,956 A | 5/1998 | Kirsch | 395/200.33 |
| 5,774,664 A | 6/1998 | Hidary et al. | 395/200.48 |
| 5,778,368 A | 7/1998 | Hogan et al. | 707/10 |
| 5,787,424 A | 7/1998 | Hill et al. | 707/6 |
| 5,802,518 A | 9/1998 | Karaev et al. | 707/9 |
| 5,809,317 A | 9/1998 | Kogan et al. | 395/762 |
| 5,812,769 A | 9/1998 | Graber et al. | 395/200.12 |
| 5,855,015 A | 12/1998 | Shoham | 707/5 |
| 5,855,020 A | 12/1998 | Kirsch | 707/10 |
| 5,860,071 A | 1/1999 | Ball et al. | 707/100 |
| 5,864,863 A | 1/1999 | Burrows | 707/103 |
| 5,870,546 A | 2/1999 | Kirsch | 395/200.33 |
| 5,892,909 A | 4/1999 | Grasso et al. | 395/200.31 |
| 6,070,158 A * | 5/2000 | Kirsch et al. | 707/3 |
| 6,226,648 B1 * | 5/2001 | Appleman et al. | 707/102 |
| 6,321,251 B1 * | 11/2001 | Deisinger et al. | 709/203 |

OTHER PUBLICATIONS

International Business Machines Corporation, "Virtual URLs for Browsing and Searching Large Information Spaces", Research Disclosure, Sep. 1998, pp. 1238–1239.

* cited by examiner

Primary Examiner—Viet D. Vu
(74) Attorney, Agent, or Firm—Alison D. Mortinger

(57) ABSTRACT

Maintenance of a repository of summary data about documents associated with document locators, the repository of summary data stored separately from the documents and containing the document locators, when a user requests a document associated with one of the document locators, by requesting the document associated with the document locator; receiving a result based on the request; analyzing the result to determine the validity of the document locator; and requesting an update of the repository based on the validity of the document locator. In a network environment, the document locators are uniform resource locators, or URLs. The repository update may for example take the form of deleting the URL from the repository, or moving it to another location for further examination.

37 Claims, 2 Drawing Sheets

USER-INITIATED MAINTENANCE OF DOCUMENT LOCATORS

TECHNICAL FIELD

This invention relates to Internet technology, and more particularly to the maintenance of a repository of summary data containing document locators such as uniform resource locators (URLs) for example one associated with a search engine.

BACKGROUND OF THE INVENTION

To conduct a search on the Internet, a user typically queries a search engine (such as Yahoo, Hotbot, etc) to find a desired piece of information, which is contained in a document stored on a web site. The search engine typically does not keep copies of documents, but instead keeps an indexed repository of summary data (also called metadata) containing links (also called hyperlinks, or uniform resource locators (URLs)) to the documents. The summary data is generated by using a gatherer to "crawl" a web site and analyze its content.

When the user queries a search engine, the search engine returns a list of results matching the query terms. Each result contains the URL for a document as well as an abstract. The user then clicks on the URL to go to the document. When the search engine repository is out of date, the URLs presented in the results may not be valid, and in such a case an error code is returned. There are several reasons why URLs may not be valid, for example the document may no longer exist or it may have been moved to another location. This problem of an invalid URL is often known as a "broken link."

Broken links are frustrating to the user, as it often takes a significant amount of time for the error message to be returned. If a user is frustrated enough times, he or she will likely become dissatisfied with the search engine and use a different one. Thus the quality of a search engine can be measured by how up to date it is, or put another way, what percentage of broken links it has in its repository.

Web sites change at a rapid pace. Because the web sites have no control over where the summary data of their documents is stored, there is no way of notifying anyone about any changes. Thus search engines currently maintain their repositories by periodically recrawling their resources (i.e. the web sites which they have summarized). One way to maintain a repository by recrawling is described in U.S. Pat. No. 5,855,020 to Kirsch. Kirsch monitors dynamic network feed for new URLs and validates them prior to adding to a repository. He also revalidates the repository by periodically assessing the validity of each URL, with the period determined by an associated volatility for each URL. This recrawling is costly in terms of time and resources, and thus cannot be performed often enough to keep up with the rapid pace of change.

Thus it is desirable to have a way to reduce or avoid URL maintenance recrawling by dynamically detecting and eliminating broken links in order to maintain a search engine (or other Internet) data repository.

SUMMARY OF THE INVENTION

A method of maintaining a repository of summary data about documents associated with document locators, the repository of summary data stored separately from the documents and containing the document locators, when a user requests a document associated with one of the document locators, by requesting the document associated with the document locator; receiving a result based on the request; analyzing the result to determine the validity of the document locator; and requesting an update of the repository based on the validity of the document locator is described. In a network environment, the document locators are uniform resource locators, or URLs. The repository update may take the form of deleting the URL from the repository, or moving it to another location for further examination.

For a fuller understanding of the nature and advantages of the present invention, reference should be made to the following detailed description taken together with the accompanying figures.

DESCRIPTION OF THE PREFERRED EMBODIMENTS

The present invention is described herein in the context of an Internet application merely as a specific example, and is not meant to limit applicability of the invention to Internet technology. Those skilled in the art will understand that the invention is broadly applicable to any method in which it is desirable to maintain a repository of summary data about documents associated with document locators, the repository of summary data stored separately from the documents and containing the document locators, when a user requests a document associated with one of the document locators, by requesting the document associated with the document locator, receiving a result based on the request, analyzing the result to determine the validity of the document locator, and requesting an update of the repository based on the validity of the document locator, including but not limited to intranet and database applications.

In order to automatically detect and eliminate broken links in an Internet repository (such as an Internet search engine repository), the user's activity is monitored. Every time the user searches the repository for a document locator (e.g. a uniform resource locator or URL) and then uses that URL to request a document from a web server, the request is intercepted by a proxy between the user and the web server, and first verifies whether the requested document is available at the location specified by the URL. If the document is available, then the contents are passed to the user. If the document is unavailable, an error code is generated and the Internet repository is updated.

Figure 1:
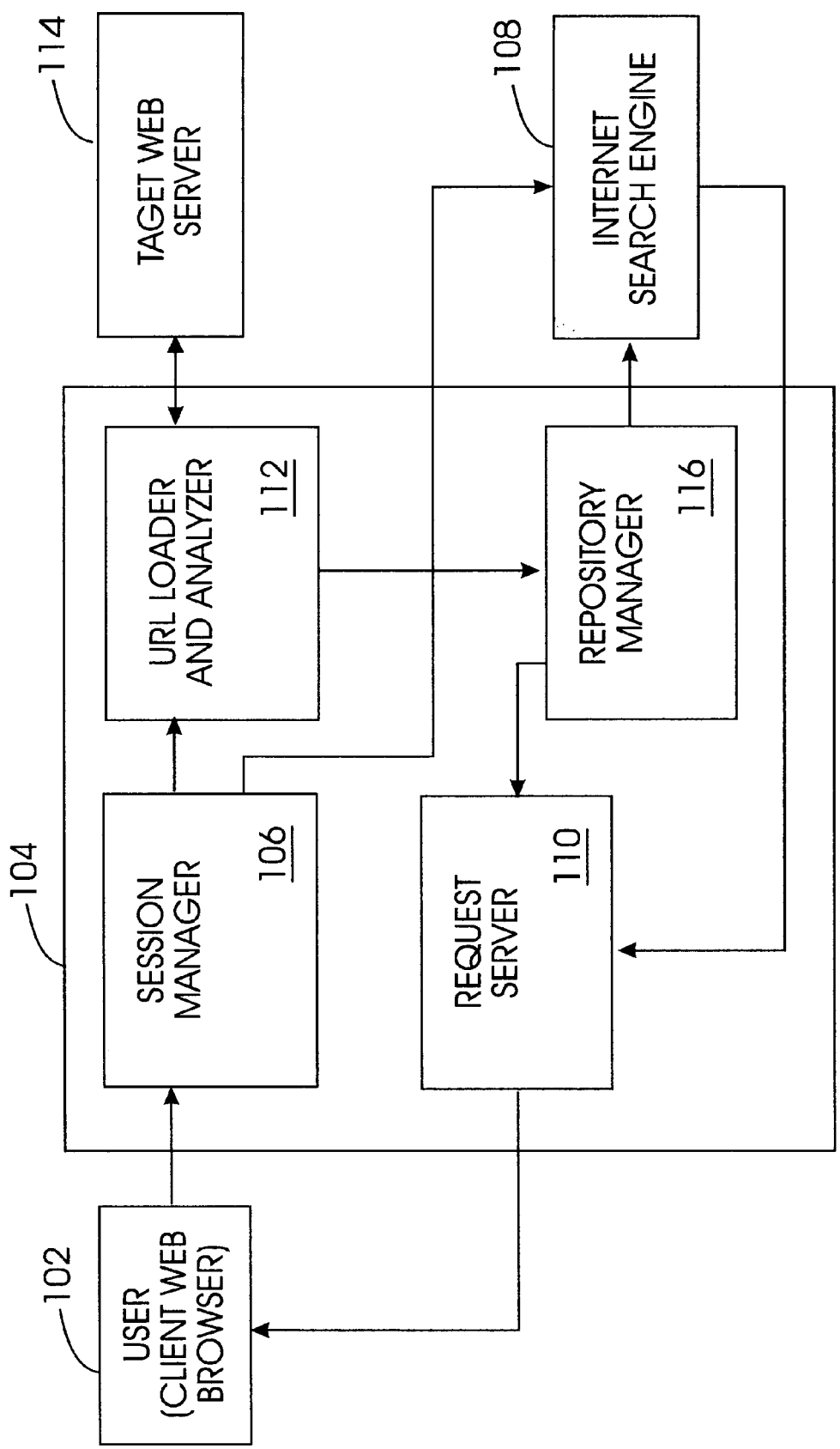
FIG. 1 shows the architecture for the Link Validator.
Figure 2:
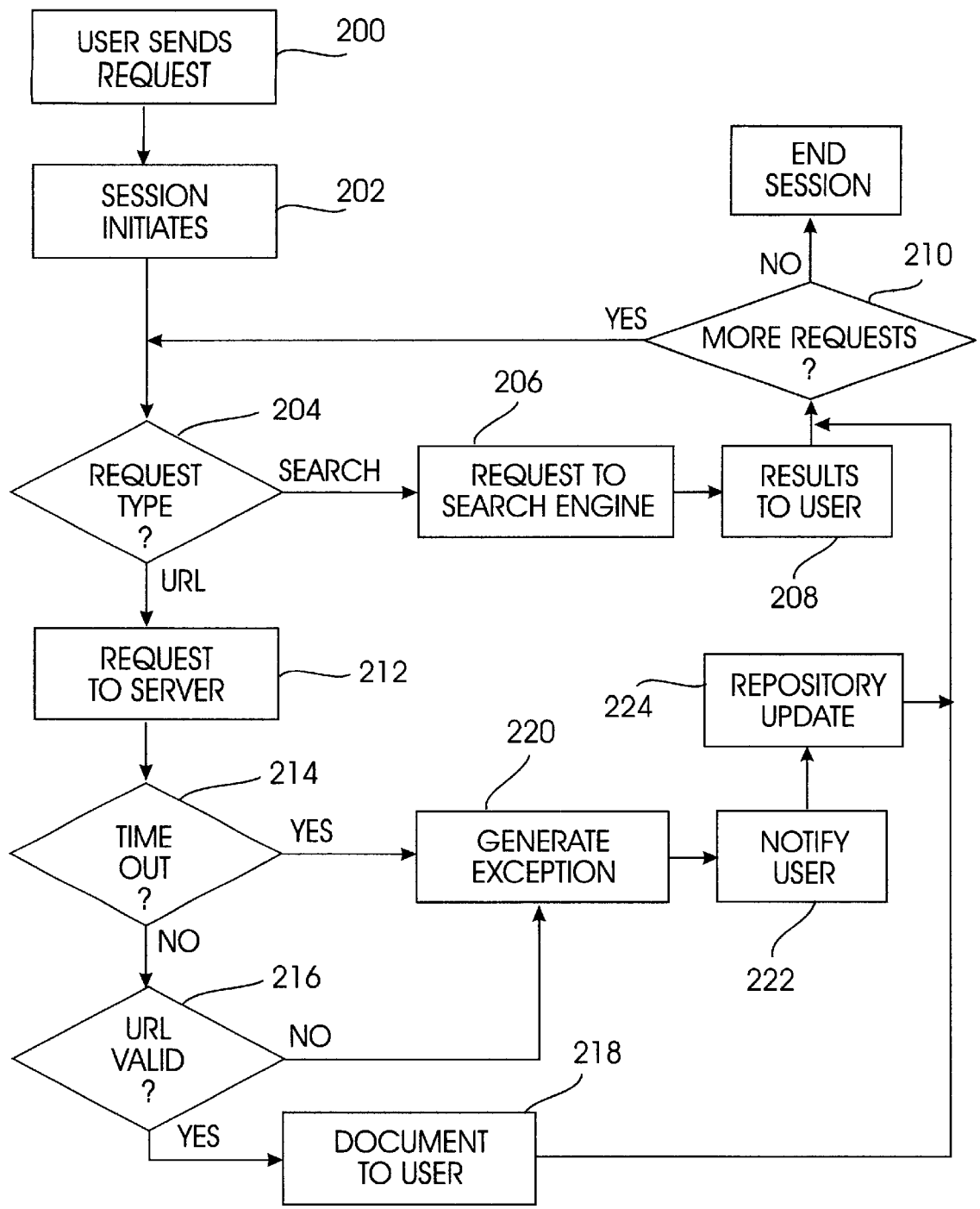
FIG. 2 shows a flowchart for method steps, in accordance with the present invention.

FIG. 1 shows the architecture for the Link Maintainer 100, and the associated steps are shown as a flowchart in FIG. 2. With reference to both Figures, in step 200 a user 102 initiates a session (between his/her client browser and a server such as a Search Engine) and sends a request, which is intercepted by a Link Validator 104 (transparent to the user). Link Validator 104 has a Session Manager 106 which manages the user session. Because the commonly used Internet protocol HTTP (HyperText Transfer Protocol) is "stateless" there is no concept of a session, i.e. there is no built-in way to associate a series of requests with a client. Ways around this include the use of "cookies" to place information on the user's computer, however cookies are found to be undesirable by many users. Here, in order to create and manage a session, Session Manager 106 adds information onto each request in order to form an association with the client in step 202.

In step 204, Link Validator 104 also determines the request type, either: (1) search, or (2) Uniform Resource Locator (URL). With a search request. the user enters a query in the form of one or more search terms (e.g. ibm and patents) without directly entering a URL. In step 206 Session Manager 106 forwards search requests to Internet Search Engine 108. Search Engine 108 then searches its repository of summary data and returns a list of results to Request Server 110, which passes the list on to user 102 in step 208. User 102 then refines the search with more requests in step 210 until the point where a URL is entered, for example by clicking on an item in the result list or by directly typing the URL on an input field. Until a URL is entered, Link Validator 104 merely passes information back and forth between user 102 and Search Engine 108.

With a URL request, a URL is entered in order to go directly to a document (e.g. http://www.ibm.patents.com). Session Manager 106 sends URL requests to a URL Loader and Analyzer 112. URL Loader and Analyzer 112 then forwards the request to the appropriate Target Web Server 114 in step 212 in order to retrieve the requested document for the user. URL Loader and Analyzer 112 then waits for a specified time interval (e.g. 1 minute).

In step 214, if the document is returned within the time interval, the URL is valid in step 216 and URL Loader and Analyzer 112 passes the document content to user 102 via Repository Manager 116 and Request Server 110 in step 218 using the appropriate protocol (such as HTTP), and no repository update is necessary. However, in step 214 if the specified time interval expires with no document returned from Web Server 114, then URL Loader and Analyzer 112 generates an exception in step 220 and marks the URL as "timed-out." In step 222 an error message is then passed to user 102 via Repository Manager 116 and Request Server 110, and Repository Manager 116 is notified about the timed-out URL.

In step 224, in order to update the repository of the Search Engine 108, Repository Manager 116 may then issue a request to Search Engine 108 for deletion of the timed-out URL from the repository (a document delete request), or alternately may request that the timed-out URL be moved to another location such as a database for later examination (for example recrawling) because the Web Server 114 may just be temporarily unavailable. Then any more requests are processed in Step 210, until the session is ended.

In step 216, if URL Loader and Analyzer 112 receives an error (rather than just a time-out) from Web Server 114, indicating an invalid URL, an exception is generated in step 220 and the error forwarded via Repository Manager 116 to Request Server 110. An error can be detected by analyzing the first line (status line) of a response message from a web server. The status line consists of a protocol version (e.g. HTTP) followed by a numeric status code and its associated textual phrase, with each element separated by whitespace characters. No CR (carriage return) or LF (linefeed) is allowed except in the final CRLF sequence. The status code element is a 3-digit integer result code of the attempt to understand and satisfy the request. These codes are fully defined in the protocol documentation, for example RFC2068 describes the HTTP protocol.

In step 222, Request Server 110 also forwards the error to user 102 using HTTP or other appropriate protocol. Additional information may optionally be added to the error message to help the user identify the cause of the problem.

When Repository Manager 116 receives the exception from URL Loader and Analyzer 112 for a URL which could not be successfully loaded, Repository Manager 116 updates the repository in step 224 by issuing a document delete request in a form that the repository of Search Engine 108 can understand. Typically a delete request will cause an automatic update of the searchable index of Search Engine 108. If Search Engine 108 does not provide this sort of functionality, a manual update request will be issued in order to perform the update.

Once the reference for the document is deleted from the searchable index of Internet Search Engine 108, a subsequent search will not present the URL associated with the document again to the user or to any other user.

Thus a significant portion of the burden of maintaining rapidly changing Internet repositories of summary data is transferred from the repository owners to the users. Furthermore, the effort is transparent to the users, as the Link Validator described above provides a seamless interface between the user and the Search Engine/Web Server. The Link Validator acts as a proxy between the user and the Server, and verifies whether the requested document is available at the location specified by the URL. If the document is unavailable, then the Link Validator's Repository Manager automatically issues a request to update the Internet repository.

The logic of the present invention may be executed by a processor as a series of computer-executable instructions. The instructions may be contained on any suitable data storage device with a computer accessible medium, such as but not limited to a computer diskette having a computer usable medium with program code stored thereon, a DASD array, magnetic tape, conventional hard disk drive, electronic read-only memory, or optical storage device.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A method of maintaining a repository of summary data about documents associated with document locators, the repository of summary data stored separately from the documents and containing the document locators, when a user requests the retrieval of a document associated with one of the document locators, comprising the steps of:

requesting the retrieval of the document associated with the document locator; receiving a result based upon the request analyzing the result to determine the validity of the document locator; and requesting an update of the repository based on the validity of the document locator.

2. The method of claim 1 wherein the requesting an update step comprises requesting that the document locator be deleted from the repository.

3. The method of claim 1 wherein the requesting an update step comprises requesting that the document locator be moved from the repository to another location.

4. The method of claim 1 wherein the documents are accessed via a network server.

5. The method of claim 4 wherein the document locator is a uniform resource locator (URL).

6. The method of claim 4 further comprising the step of associating the user request with the user.

7. The method of claim 5 further comprising the step of determining if the request is a URL request.

8. The method of claim 5 wherein the result is a response message received from the server and wherein the step of analyzing the result comprises examining a status line of the response message.

9. The method of claim 5 wherein the URL is invalid.

10. The method of claim 7 wherein the repository update comprises deleting the invalid URL.

11. The method of claim 7 wherein the repository update comprises moving the URL to another location.

12. The method of claim 1 further comprising the step of sending a notification to the user containing the result.

13. The method of claim 12 wherein the notification also comprises an explanation of the result.

14. A system for maintaining a repository of summary data about documents associated with document locators, the repository of summary data stored separately from the documents and containing the document locators, when a user requests the retrieval of a document associated with one of the document locators, the system comprising:

means for requesting the retrieval of the document associated with the document locator;

means for receiving a result based upon the request, the receiving means coupled to the document requesting means;

an analyzer, coupled to the receiving means, for analyzing the result to determine the validity of the document locator; and a repository manager, coupled to the analyzer, for requesting an update of the repository based on the validity of the document locator.

15. The system of claim 14 wherein the repository update request comprises a request that the document locator be deleted from the repository.

16. The system of claim 14 wherein the repository update request comprises a request that the document locator be moved from the repository to another location.

17. The system of claim 14 wherein the documents are accessed via a network server.

18. The system of claim 14 further comprising a session manager for associating the user request with the user.

19. The system of claim 17 wherein the document locator is a uniform resource locator (URL).

20. The system of claim 19 wherein the result is a response message received from the server and wherein the analyzer has means for examining a status line of the response message.

21. The system of claim 20 wherein the repository manager comprises means for requesting that the URL be deleted from the repository if the URL is invalid.

22. The system of claim 19 wherein the repository manager comprises means for requesting that the URL be moved from the repository to another location if the URL is invalid.

23. The system of claim 14 further comprising means for sending a notification to the user containing the result.

24. The system of claim 23 wherein the notification also comprises an explanation of the result.

25. A program storage device readable by a machine, tangibly embodying a program of instructions executable by the machine to perform the method steps for maintaining a repository of summary data about documents associated with document locators, the repository of summary data stored separately from the documents and containing the document locators, when a user requests the retrieval of a document associated with one of the document locators, said method steps comprising:

requesting the retrieval of the document associated with the document locator;

receiving a result based upon the request analyzing the result to determine the validity of the document locator; and requesting an update of the repository based on the validity of the document locator.

26. The device of claim 25 wherein the requesting an update step comprises requesting that the document locator be deleted from the repository.

27. The device of claim 25 wherein the requesting an update step comprises requesting that the document locator be moved from the repository to another location.

28. The device of claim 25 wherein the documents are accessed via a network server.

29. The device of claim 28 wherein the document locator is a uniform resource locator (URL).

30. The device of claim 28 further comprising the step of associating the user request with the user.

31. The device of claim 29 further comprising the step of determining if the request is a URL request.

32. The device of claim 29 wherein the result is a response message received from the server and wherein the step of analyzing the result comprises examining a status line of the response message.

33. The device of claim 29 wherein the URL is invalid.

34. The device of claim 33 wherein the repository update comprises deleting the invalid URL.

35. The device of claim 33 wherein the repository update comprises moving the URL to another location.

36. The device of claim 25 further comprising the step of sending a notification to the user containing the result.

37. The device of claim 36 wherein the notification also comprises an explanation of the result.

* * * * *